United States Patent
Nagayasu et al.

(10) Patent No.: US 9,272,643 B2
(45) Date of Patent: Mar. 1, 2016

(54) VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Hidetaka Nagayasu, Aichi-ken (JP); Osamu Kaneko, Aichi-ken (JP); Eishi Takeuchi, Shizuoka-ken (JP); Kohshi Katoh, Kanagawa-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/474,505

(22) Filed: Sep. 2, 2014

(65) Prior Publication Data
US 2015/0061338 A1  Mar. 5, 2015

(30) Foreign Application Priority Data
Sep. 2, 2013  (JP) ................. 2013-181236

(51) Int. Cl.
*B60N 2/02* (2006.01)
*B60N 2/44* (2006.01)
*B60N 2/64* (2006.01)
*B60N 2/68* (2006.01)
(Continued)

(52) U.S. Cl.
CPC .............. *B60N 2/449* (2013.01); *B60N 2/2222* (2013.01); *B60N 2/39* (2013.01); *B60N 2/643* (2013.01); *B60N 2/686* (2013.01); *B60N 2205/30* (2013.01)

(58) Field of Classification Search
CPC ...... A47C 7/42; A47C 1/03294; A47C 1/032; A47C 7/48; A47C 7/40; A61G 15/125; B60N 2/2222; B60N 2/2236
USPC .................................. 297/353, 354.11, 383
See application file for complete search history.

(56) References Cited

U.S. PATENT DOCUMENTS 148,380 A * 3/1874 Perrenet ...................... 297/354.1
3,552,797 A * 1/1971 D'Houdain ................. 297/354.1
(Continued)

FOREIGN PATENT DOCUMENTS

DE 19501087 A1 * 7/1996 ............... B62K 5/00
JP 57-126734  8/1982
(Continued)

OTHER PUBLICATIONS

Japanese Office Action for JP App. No. 2013-181236 mailed on Aug. 18, 2015, along with an English-language translation thereof.

*Primary Examiner* — Laurie Cranmer
(74) *Attorney, Agent, or Firm* — Greenblum & Bernstein, P.L.C.

(57) ABSTRACT

There is provided a vehicle seat including a seat cushion configured to support a weight of a sitting passenger from below, and a seat back configured to support an upper body of the sitting passenger from a back side thereof. The seat back includes a seat back fixing part including a back frame which configures a frame of the seat back, and a seat back moving part configured to support the upper body of the passenger at a passenger sitting surface side of the seat back fixing part. The seat back moving part is supported to the seat back fixing part so as to be rotatable about an upper part thereof in a left-right direction which corresponds to lateral sides of the sitting passenger.

3 Claims, 6 Drawing Sheets

(51) Int. Cl.
*B60N 2/22* (2006.01)
*B60N 2/39* (2006.01)

(56) References Cited

U.S. PATENT DOCUMENTS

| | | | |
|---|---|---|---|
| 4,377,308 A * | 3/1983 | Pisanu | 297/353 |
| 6,059,363 A * | 5/2000 | Roslund et al. | 297/353 |
| 8,465,095 B2 * | 6/2013 | Su | 297/354.1 |
| 2003/0167570 A1 | 9/2003 | Magistretti | |
| 2009/0102264 A1 * | 4/2009 | Fischer et al. | 297/354.1 |
| 2014/0191550 A1 | 7/2014 | Katoh et al. | |

FOREIGN PATENT DOCUMENTS

| | | | |
|---|---|---|---|
| JP | 57144136 A * | 9/1982 | B60N 1/02 |
| JP | 2003-265269 | 9/2003 | |
| JP | 2008-295690 | 12/2008 | |
| WO | 2013/021497 | 2/2013 | |
| WO | 2015/011803 | 1/2015 | |

* cited by examiner

VEHICLE SEAT

BACKGROUND OF THE INVENTION

1. Field of the Invention

The present invention relates to a vehicle seat including a seat cushion configured to support a weight of a sitting passenger from below and a seat back configured to support an upper body of the sitting passenger from a back side thereof.

2. Description of the Related Art

When turning a vehicle, a driver operates a steering wheel to the left or right side. Therefore, an upper body of the driver is inclined inwardly in a turning direction of the vehicle according to the steering wheel operation. FIG. 6 shows a movement of an upper body of a driver as seen from a back side of the driver when the driver of a vehicle operates a steering wheel to the left side so as to turn the vehicle leftwards. Here, a shoulder line PS of the driver is lowered at the left from a position shown with a broken line to a position shown with a solid line, and a waist line PL is raised at the left from a position shown with the broken line to a position shown with the solid line, so that the upper body is bent. That is, as the steering wheel is operated leftwards, the upper body (shown with a triangle in FIG. 6) of the driver is inclined leftwards about the waist part, so that it forms a tilted L shape, when seen from the back side. In FIG. 6, a reference numeral PH indicates a position of a head of the driver. Also, it has been empirically known that a passenger other than the driver also tilts the upper body in the turning direction of the vehicle against a centrifugal force resulting from the turning of the vehicle. At this time, since both the driver and the other passenger lean the upper bodies against the seat backs, they raise the upper bodies from the leaning state against the seat backs to reduce friction between the upper bodies and the seat backs or tilt the upper bodies against a frictional force such that the upper bodies are separated from the seat backs so as to tilt the upper bodies, as described above. Accordingly, the passenger cannot smoothly tilt the upper body in a left-right direction.

Although a technical object is different from that explained above, there has been developed a technique in which a seat back and a seat cushion are rotated in a vehicle roll direction with respect to a traveling direction of a vehicle so as to cope with the centrifugal force occurring at the turning of the vehicle such that a posture of a passenger is stable at the turning (refer to JP-A-S57-126734).

The seat of JP-A-S57-126734 is applied with a counter measure against the problem occurring at the turning of the vehicle. However, it is not possible to solve the technical object that the passenger can smoothly tilt the upper body in the left-right direction at the turning of the vehicle. That is, according to JP-A-S57-126734, the seat is rotated by the centrifugal force at the turning of the vehicle. However, since the upper body is tilted in the left-right direction at the turning of the vehicle before the centrifugal force is applied, the configuration of rotating the seat by the applied centrifugal force cannot solve the technical object that the passenger can smoothly tilt the upper body in the left-right direction at the turning of the vehicle.

SUMMARY

Accordingly, it is an object of the present invention to enable a passenger to smoothly tilt an upper body thereof in a left-right direction at turning of a vehicle by rotating a seat back with a movement of the upper body of the passenger when the passenger tilts the upper body in the left-right direction at the turning of the vehicle.

According to an illustrative embodiment of the present invention, there is provided a vehicle seat including a seat cushion configured to support a weight of a sitting passenger from below, and a seat back configured to support an upper body of the sitting passenger from a back side thereof. The seat back includes a seat back fixing part including a back frame which configures a frame of the seat back, and a seat back moving part configured to support the upper body of the passenger at a passenger sitting surface side of the seat back fixing part. The seat back moving part is supported to the seat back fixing part so as to be rotatable about an upper part thereof in a left-right direction which corresponds to lateral sides of the sitting passenger.

According to the above configuration, when the passenger tilts the upper body in the left-right direction to form a tilted L shape as seen from the back side at turning of the vehicle, the seat back moving part is rotated relative to the seat back fixing part in conformity to the movement of the upper body of the passenger. When the passenger tilts the upper body in the left-right direction to form a tilted L shape as seen from the back side at turning of the vehicle, a lower part of the back of the passenger is supported to the lower part of the seat back moving part in many cases. Therefore, as the upper body of the passenger is moved, the seat back moving part is rotated relative to the seat back fixing part. Therefore, the passenger can reduce the friction between the upper body and the seat back without separating the upper body from the seat back which needs to be done in the related-art configuration, so that the passenger can smoothly tilt the upper body in the left-right direction.

Also, when the passenger sits on the vehicle seat in the same posture for a long time, a fatigue degree of the passenger is increased. However, according to the above configuration, when the passenger tilts the upper body in the left-right direction to form a tilted L shape as seen from the back side, the seat back moving part is correspondingly rotated about an upper thereof. Therefore, the passenger can easily move the body in the left-right direction in the sitting posture, so that it is possible to promote the blood circulation in the body, thereby suppressing the increase in the fatigue degree.

In the above vehicle seat, the seat back fixing part may include side support parts at left and right sides so as to support lateral sides of the upper body of the sitting passenger, and the seat back moving part may be configured to be rotatable in the left-right direction about an upper center part of the seat back fixing part while sliding in the left-right direction relative to a lower part of the seat back fixing part, and may include a restraint mechanism configured to restrain a rotating range of the seat back moving part in the left-right direction to be within inner sides of the left and right side support parts.

According to the above configuration, the center part of the seat back at the passenger sitting surface side is rotated by the seat back moving part. However, the rotating range is restrained to within the inner sides of the left and right side support parts, and both left and right sides of the sitting passenger are supported by the side support parts of the seat back fixing part. Therefore, the passenger can smoothly tilt the upper body in the left-right direction to form a tilted L shape as seen from the back side, and it is possible to suppress the support of the upper body of the passenger from being unstable.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
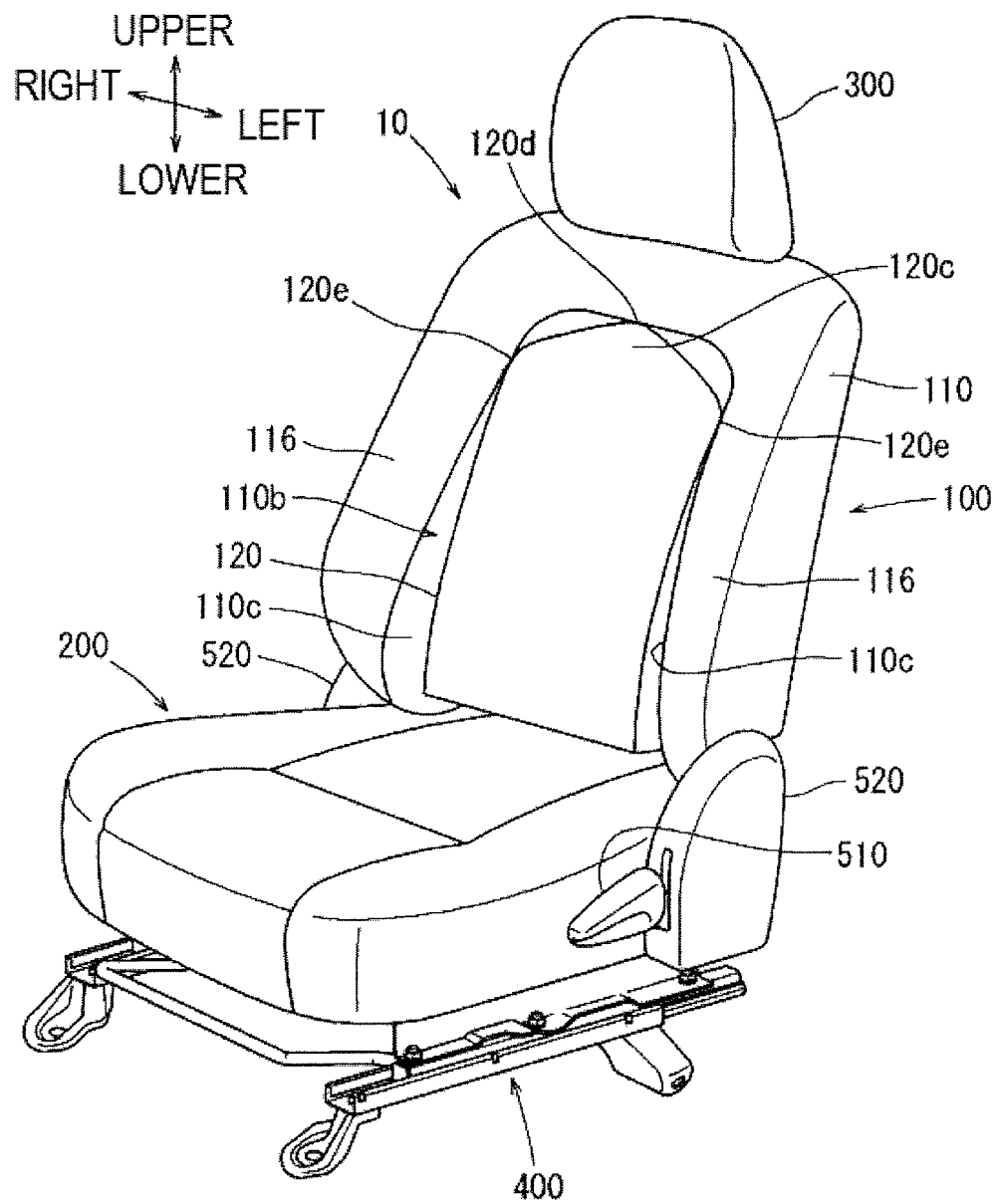
FIG. 1 is a perspective view of a vehicle seat according to a first illustrative embodiment of the present invention.

FIGS. 1 to 4 show a first illustrative embodiment of the present invention. In this illustrative embodiment, the present invention is applied to a vehicle seat on which one person sits. In the respective drawings, each direction of the vehicle seat is indicated by an arrow. In the descriptions below, directions are described based on the directions shown in the drawings.

A vehicle seat (hereinafter, simply referred to as 'seat') 10 includes a seat cushion 200 configured to support a weight of a sitting passenger from below and a seat back 100 configured to support an upper body of the sitting passenger from a back side thereof. The seat cushion 200 is fixed to a vehicle floor via slide rails 400 and is configured to arbitrarily adjust a position thereof in a longitudinal direction of a vehicle. Also, a headrest 300 is fixed to an upper part of the seat back 100. The seat back 100 is configured to arbitrarily adjust a reclining angle relative to the seat cushion 200, i.e. a recliner (not shown) is provided to hinge parts of the seat back and the seat cushion. The recliner is connected with a reclining lever 510. When the reclining lever 510 is operated, a lock of the recliner is released, so that the reclining angle of the seat back 100 can be adjusted. The recliner is hidden by a shield 520. The configuration of the vehicle seat 10 described above is known and the explication is omitted.

Figure 2:
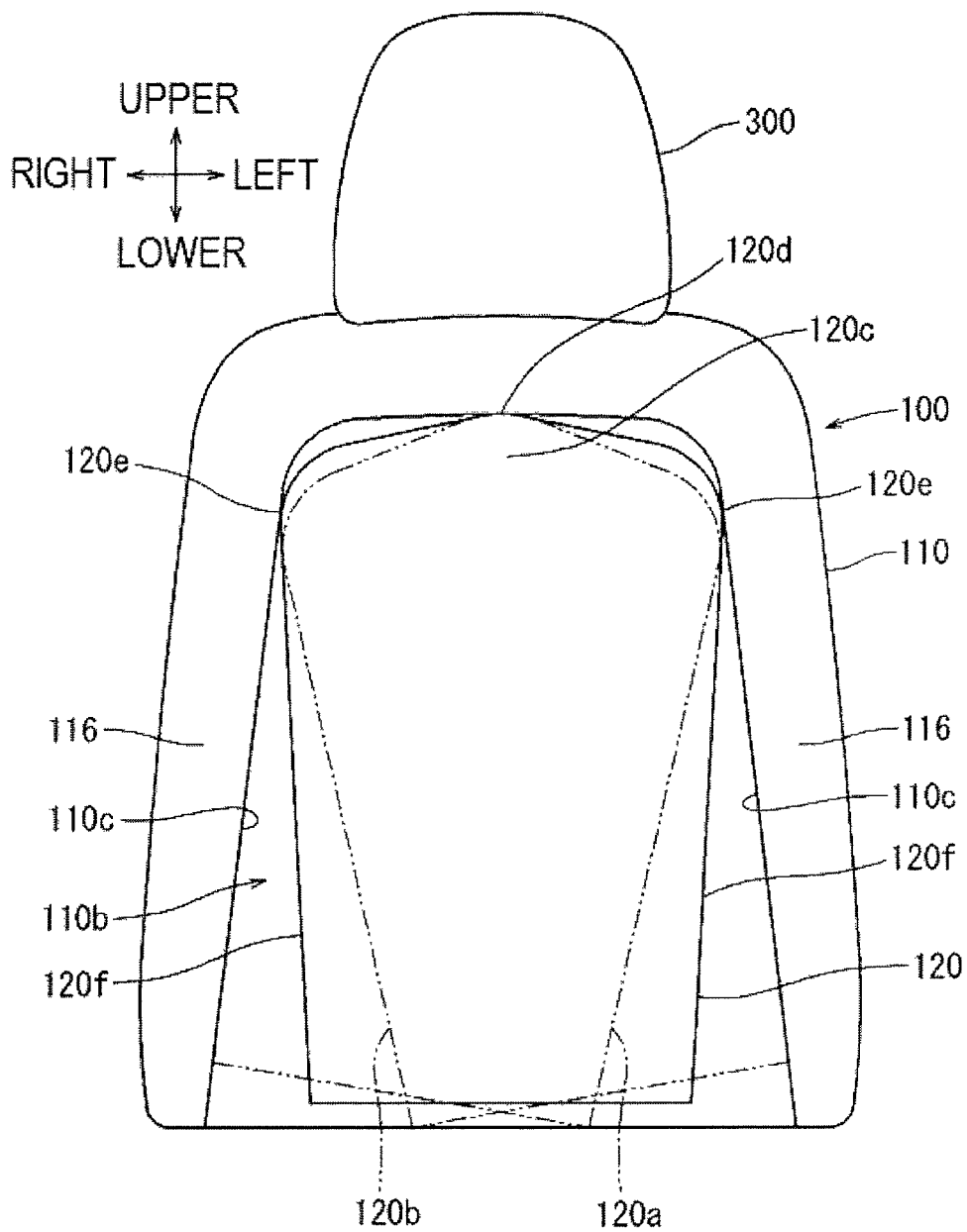
FIG. 2 is a front view of the seat back in the first illustrative embodiment.

In this illustrative embodiment of the present invention, the seat back 100 includes a seat back fixing part 110 and a seat back moving part 120. The seat back moving part 120 is supported in a concave part 110b at a front face side of the seat back fixing part 110 such that the seat back moving part 120 can be rotated in a left-right direction which correspond to lateral sides of the sitting passenger about an upper part 120c thereof. Here, the seat back moving part 120 is formed to abut on an inner wall of the concave part 110b of the seat back fixing part 110 only at an upper center part 120d and at left and right upper parts 120e, and the other parts form a gap from the inner wall of the concave part 110b of the seat back fixing part 110. That is, the seat back fixing part 110 has a gate shape, when seen from the front, and the seat back moving part 120 has an urceolate shape of which a lower part is narrower than an upper part thereof, when seen from the front. FIG. 2 shows a pattern of rotating movement of the seat back moving part 120 in the concave part 110b of the seat back fixing part 110. Here, a state where the seat back moving part 120 is located at a center position is shown with a solid line, a state rotated rightwards is shown with a virtual line 120a and a state rotated leftwards is shown with a virtual line 120b.

When the seat back moving part 120 is located at the position shown with the virtual line 120a and the position shown with the virtual line 120b, side parts 120f of the seat back moving part 120 abut on side walls of the seat back fixing part 110, so that the further rotating movement is restrained. That is, the restraint mechanism may be implemented by the configuration where the side parts 120f of the seat back moving part 120 abut on the inner side walls 110c of the seat back fixing part 110. Also, the inner side walls 110c of the seat back fixing part 110 on which the side parts 120f of the seat back moving part 120 abut are configured by side support parts 116.

Figure 3:
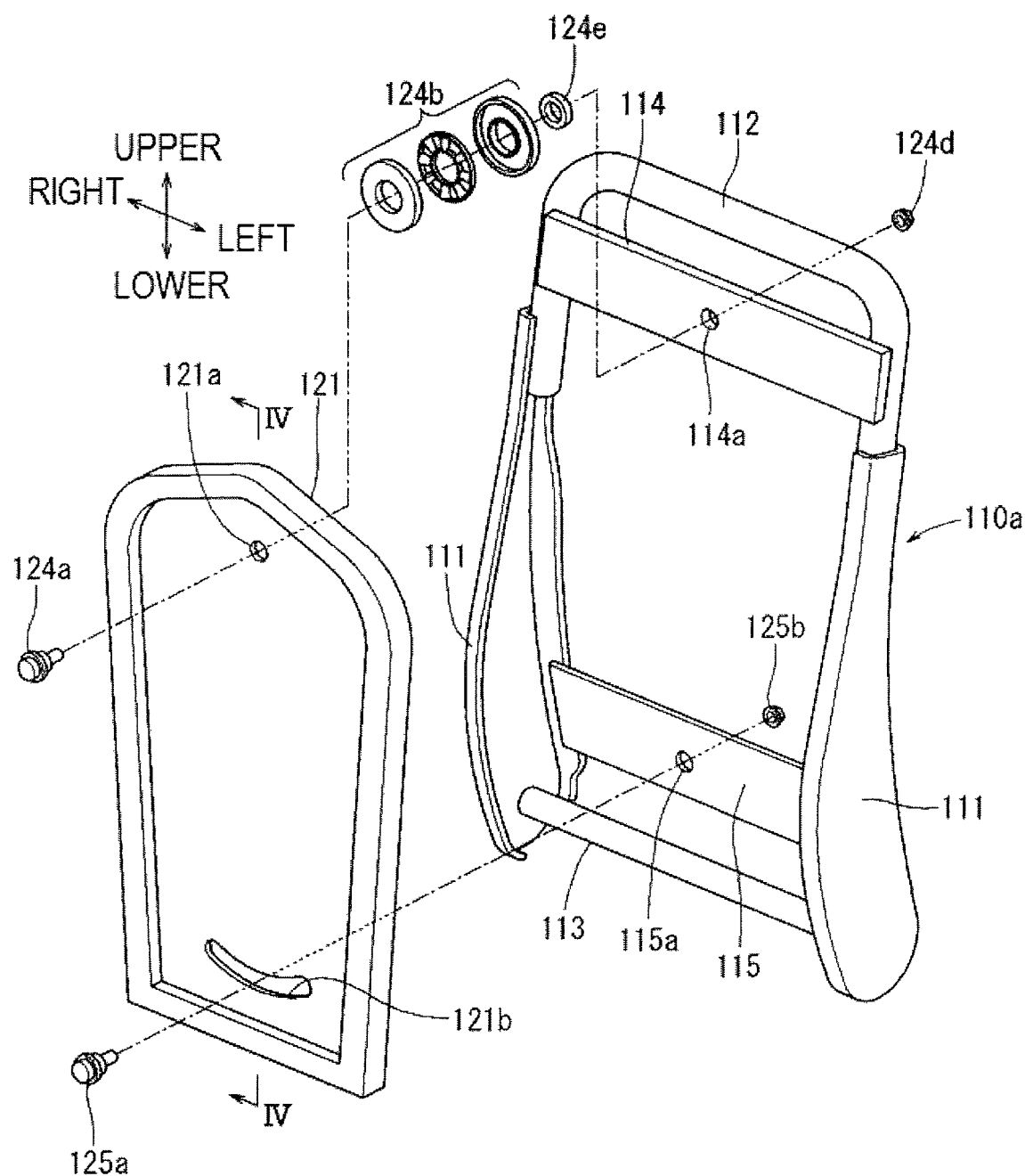
FIG. 3 is an exploded perspective view showing a frame of the seat back in the first illustrative embodiment.

FIG. 3 shows a frame of the seat back 100. In the seat back 100, the frame of the seat back fixing part 110 is substantially the same as a frame of a general seat back, and an upper pipe 112 is integrally connected to upper parts of a pair of left and right side frames 111 by welding. Also, an upper panel 114 is integrally connected to a lower part of the upper pipe 112 by the welding, and a lower panel 115 is integrally connected to rear lower parts of the side frames 111 by welding or bolt fastening. The side frames 111 are provided at their lower end portions with a connecting pipe 113 which is used to connect the left and right recliners (not shown). The frame of the seat back fixing part 110 configures a back frame 110a.

Figure 4:
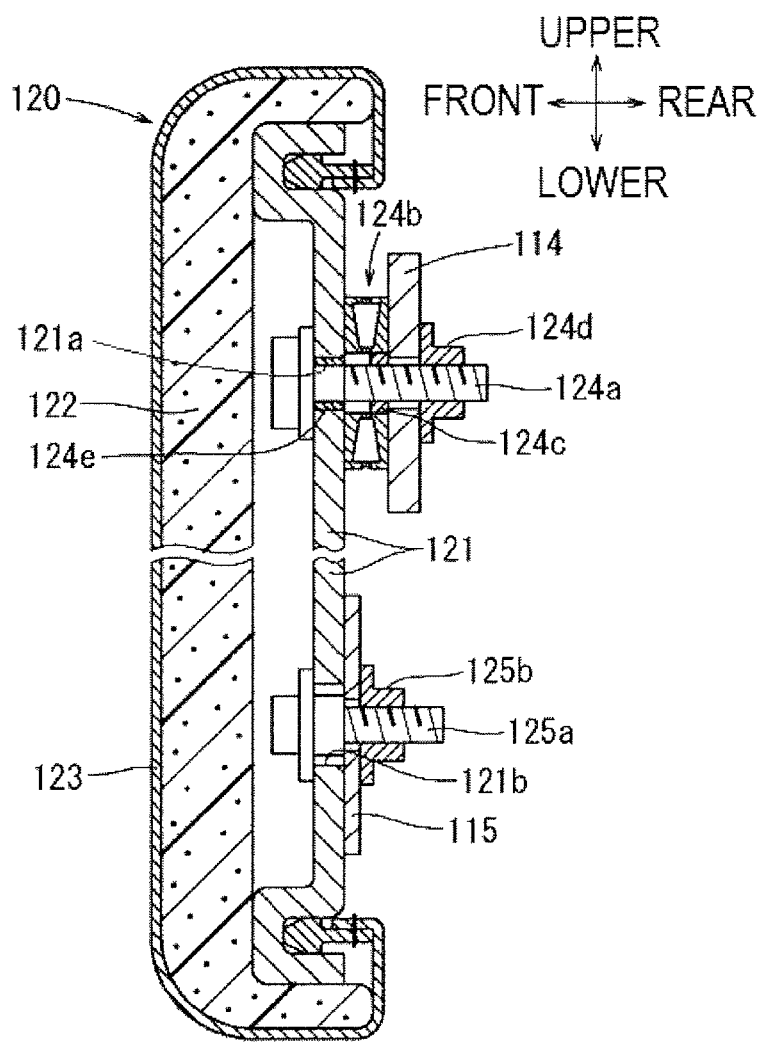
FIG. 4 is a sectional view taken along a line IV-IV of FIG. 3.

In the meantime, a frame of the seat back moving part 120 is configured by a support plate 121 having a plate surface configured to support an upper body of a passenger from a back side thereof. The support plate 121 is formed at an upper center with a through-hole 121a. A stepped bolt 124a passes through the through-hole 121a and a through-hole 114a formed at a center portion of the upper panel 114. The support plate 121 can be rotated in the left-right direction relative to the back frame 110a about the stepped bolt 124a. A position of the stepped bolt 124a corresponds to the upper part 120c of the seat back moving part 120. As shown in FIG. 4, a nut 124d is screwed onto a tip of the stepped bolt 124a, so that the support plate 121 is connected to the upper panel 114. Here, a thrust bearing 124b and a positioning collar 124c are inserted between the support plate 121 and the upper panel 114. Accordingly, when the support plate 121 is rotated relative to the upper panel 114, a frictional resistance is reduced and the yaw stiffness of the support plate 121 is increased. Also, a bush 124e is arranged between the through-hole 121a of the support plate 121 and the stepped bolt 124a, so that the frictional resistance is reduced when the support plate 121 is rotated relative to the stepped bolt 124a.

The support plate 121 is formed at a lower center with a guide hole 121b. The guide hole 121b has an arc shape following a rotating trajectory when the support plate 121 is rotated about the stepped bolt 124a passing through the through-hole 121a. A stepped bolt 125a passes through the guide hole 121b and a through-hole 115a formed at a center portion of the lower panel 115. A nut 125b is screwed onto a tip of the stepped bolt 125a, so that the support plate 121 is connected to the lower panel 115. Therefore, when the support plate 121 is rotated about the stepped bolt 124a, it is guided by the guide hole 121b, so that the support plate 121 is rotated between the left and right side frames 111 of the back frame 110a. When the support plate 121 is rotated in the left-right direction and reaches a position approaching the left and right side frames 111, the stepped bolt 125a abuts on an end portion of the guide hole 121b, thereby restraining the rotation of the support plate 121. That is, the restraint mechanism may be configured by the combination of the stepped bolt 125a and the guide hole 121b.

The back frame 110a is covered with a back pad and a seat cover, so that the seat back fixing part 110 is formed. At this time, as described above, the front face side of the seat back fixing part 110 is formed with the concave part 110b for arranging the seat back moving part 120 therein. Also, a front face side of the support plate 121 is also covered with a pad 122 and a seat cover 123, similar to the seat back fixing part 110, so that the seat back moving part 120 is formed.

According to the above illustrative embodiment, when the passenger tilts the upper body in the left-right direction to form a tilted L shape as seen from the back side at turning of the vehicle, the seat back moving part 120 is rotated relative to the seat back fixing part 110 according to the movement of the upper body of the passenger. When the passenger tilts the upper body in the left-right direction to form a tilted L shape as seen from the back side at turning of the vehicle, a lower part of the back of the passenger is supported to the lower part of the seat back moving part 120 in many cases. Therefore, as the upper body of the passenger is moved, the seat back moving part 120 is rotated relative to the seat back fixing part 110. Therefore, the passenger can reduce the friction between the upper body and the seat back 100 without separating the upper body from the seat back 100, so that the passenger can smoothly tilt the upper body in the left-right direction.

Also, when the passenger sits on the seat 10 in the same posture for a long time, the fatigue degree of the passenger is increased. However, when the passenger tilts the upper body in the left-right direction to form a tilted L shape as seen from the back side, the seat back moving part 120 is correspondingly rotated about the upper part 120c. Therefore, the passenger can easily move the body in the left-right direction in the sitting posture, so that it is possible to promote the blood circulation in the body, thereby suppressing the increase in the fatigue degree.

Further, the center part of the seat back 100 at the passenger sitting surface side is rotated by the seat back moving part 120. However, the rotating range is restrained to the inner sides of the left and right side support parts 116, and both left and right sides of the sitting passenger are supported by the side support parts 116 of the seat back fixing part 110. Therefore, the passenger can smoothly tilt the upper body in the left-right direction to form a tilted L shape as seen from the back side, and it is possible to suppress the support of the upper body of the passenger from being unstable.

Figure 5:
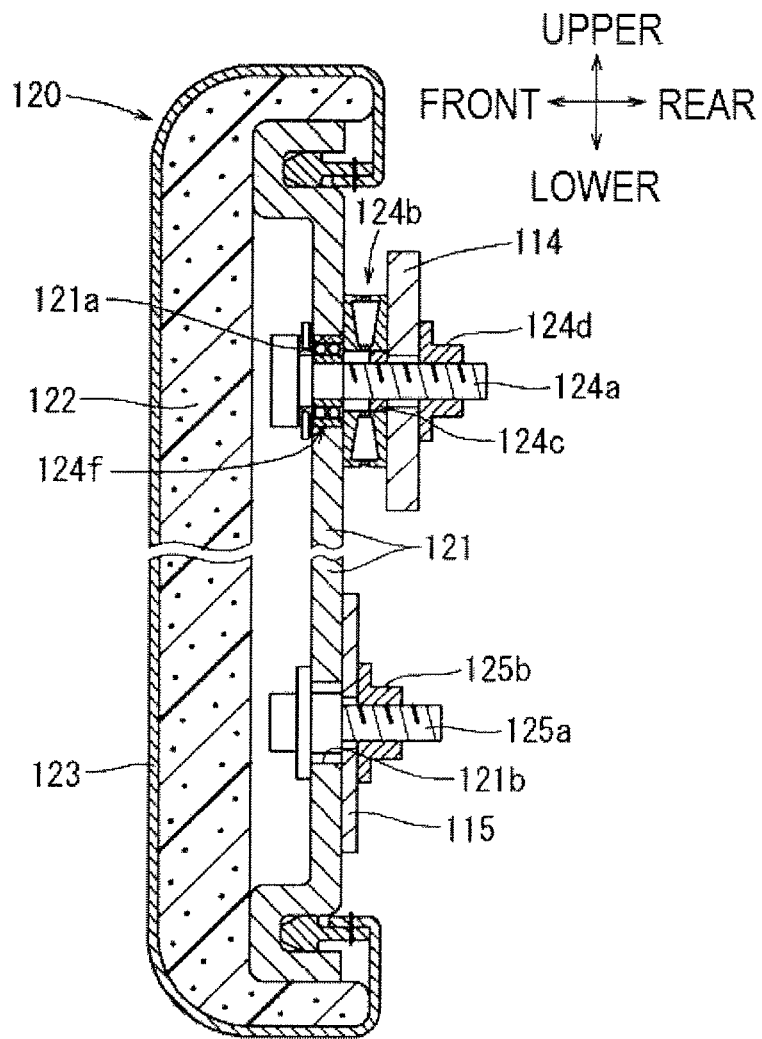
FIG. 5 is a sectional view corresponding to FIG. 4, which shows a second illustrative embodiment of the present invention.
Figure 6:
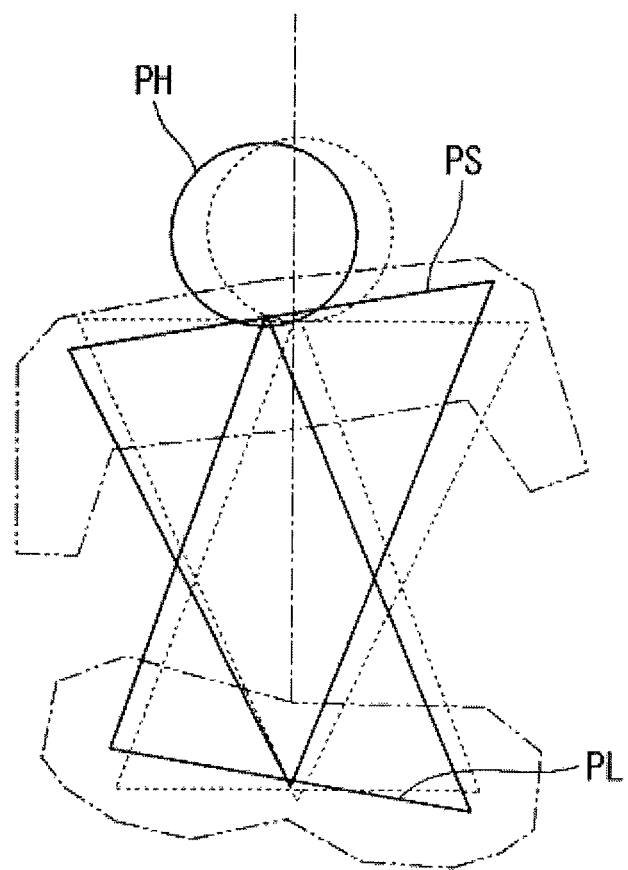
FIG. 6 is a schematic view showing a movement of an upper body of a driver when the driver operates a steering wheel so as to turn a vehicle leftwards.

FIG. 5 shows a second illustrative embodiment of the present invention. The second illustrative embodiment is different from the first illustrative embodiment in that a radial bearing 124f is used instead of the bush 124e (refer to FIG. 4). The other configurations are the same as the first illustrative embodiment and the overlapping descriptions and illustration are omitted.

Even though the radial bearing 124f is used instead of the bush 124e, it is possible to reduce the frictional resistance when the support plate 121 is rotated relative to the stepped bolt 124a since the radial bearing 124f is arranged between the through-hole 121a of the support plate 121 and the stepped bolt 124a.

Although the specific illustrative embodiments have been described, the present invention is not limited to the outer appearances and configurations of the illustrative embodiments, and a variety of changes, additions and deletions can be made without departing from the gist of the present invention, as shown below, for example.

1. In the above illustrative embodiments, a rotational shaft for rotating the support plate 121 is fixed on the back frame 110a. However, the rotational shaft may be fixed on the support plate 121.

2. In the above illustrative embodiments, the support plate 121 is formed with the guide hole 121b and the lower panel 115 is provided with the stepped bolt 125a passing through the guide hole 121b. However, in contrast, the lower panel 115 may be formed with the guide hole 121b and the support plate 121 may be provided with the stepped bolt 125a. Also, when the connection of rotatably supporting the support plate 121 to the back frame 110a at the upper part of the support plate 121 is strong, the connection by the guide hole 121b and the stepped bolt 125a between the support plate 121 and the lower panel 115 may be omitted. Further, the restraint mechanism which is the combination of the guide hole 121b and the stepped bolt 125a may be provided at a plurality of positions.

3. In the above illustrative embodiments, the seat back moving part 120 is accommodated in the concave part 110b of the seat back fixing part 110. However, the seat back moving part 120 may be arranged to overlap with the front face side of the seat back fixing part 110. In this case, the seat back fixing part 110 may have a structure where the front face side thereof is completely covered by the seat back moving part 120.

4. In the above illustrative embodiments, the present invention is applied to the vehicle seat on which one person sits. However, the present invention can be also applied to a seat on which a plurality of persons can sit.

What is claimed is:

1. A vehicle seat comprising:
   a seat cushion configured to support a weight of a sitting passenger from below; and
   a seat back configured to support an upper body of the sitting passenger from a back side thereof,
   wherein the seat back includes:
      a seat back fixing part including a back frame, and
      a seat back moving part configured to support the upper body of the passenger at a passenger sitting surface side of the seat back fixing part, and
   wherein the seat back moving part is supported by the seat back fixing part so as to be rotatable about an upper part thereof in a left-right direction of the vehicle seat relative to the seat cushion.

2. The vehicle seat according to claim 1,
   wherein the seat back fixing part includes side support parts at left and right sides configured to support lateral sides of the upper body of the sitting passenger, and
   wherein the seat back moving part is configured to be rotatable in the left-right direction about an upper center part of the seat back fixing part while sliding in the left-right direction relative to a lower part of the seat back fixing part, and includes a restraint mechanism configured to restrain a rotating range of the seat back moving part in the left-right direction to be within inner sides of the left and right side support parts.

3. The vehicle seat according to claim 1,
   wherein the seat back fixing part is provided with a bolt fixed to the seat back fixing part at a lower part of the seat back fixing part, and the seat back moving part is provided with a guide hole having an arc shape to which the bolt is slidably inserted when the seat back moving part is rotated.

* * * * *